United States Patent [19]
Taniguchi

[11] Patent Number: 4,938,588
[45] Date of Patent: Jul. 3, 1990

[54] DISTANCE DETECTING APPARATUS
[75] Inventor: Toshihiko Taniguchi, Ikoma, Japan
[73] Assignee: West Electric Company, Ltd., Osaka, Japan
[21] Appl. No.: 248,368
[22] Filed: Sep. 23, 1988
[30] Foreign Application Priority Data
Sep. 24, 1987 [JP] Japan .................. 62-239336
[51] Int. Cl.$^5$ ............ G01C 3/00; G01C 5/00; G03B 3/00
[52] U.S. Cl. ........................... 356;1; 354/403; 354/408
[58] Field of Search ............. 356/1; 354/403, 408
[56] References Cited
U.S. PATENT DOCUMENTS
4,660,955 4/1987 Ishida et al. .................. 354/408
4,682,872 7/1987 Suzuki et al. .................. 354/403
4,701,048 10/1987 Tokuda et al. ................. 354/403
4,796,044 1/1989 Amanuma et al. ............. 354/403

FOREIGN PATENT DOCUMENTS
60-211412 10/1985 Japan .

Primary Examiner—Stephen C. Buczinski
Attorney, Agent, or Firm—Cushman, Darby & Cushman

[57] ABSTRACT

In a distance detecting apparatus comprising a light receiving sensor PSD which outputs two photo-currents which correspond to the incident angle of reflection of light reflected from an object lit by emitted comprising, an integral capacitor and a pair of logarithmic converters, a shift of the PSD away from the center of the optical axis can be easily compensated by simple electrical adjustment of constant current value of constant current source in a power source shifting circuit connected to one of the logarithmic converters.

20 Claims, 9 Drawing Sheets

DISTANCE DETECTING APPARATUS

BACKGROUND OF THE INVENTION

1. Field of the Invention

The present invention relates to a distance detecting apparatus for obtaining a distance measurement of an object using triangulation. This apparatus detects two photo-currents are output from a light sensitive element, in proportion to an image position determined by a reflected light from the object on the photosensitive element surface. An integration operation is then conducted to give a distance signal. The present invention can be adjusted for slippage from a calibrated position of the light-receiving sensor by means of electrical adjustment.

2. Description of the Prior Art

Various proposals and practical uses have been made heretofore to detect the distance of an object in automated triangulation. But, in the principle of measurement by a distance detecting apparatus, a position of a beam spot on a light receiving sensor (PSD) formed by light reflected by an object must be in a designed reference position which is apart by a predetermined distance from the center of the PSD (the center is on the optical axis). When a focused spot is formed accurately on the reference position of an optical system thereof, the PSD outputs an accurate measurement data of distance information. However, if an electrical center of light receiving sensor is not set up accurately at an optical axis of the light receiving optical system, the image forming position does not correspond to an accurate distance to an object.

Causes of the failure of an electrical center of a light receiving sensor correspond with the fixed reference position is attributable to the displacement of the set-up position of the sensors, and the displacement of the sensors themselves. In the prior art, calibration is conducted by appropriate movement of the light emitting element or of a light receiving sensor so as to output a predetermined signal corresponding with fixed distance of an object. In the prior art, the position deviation of the light-receiving sensor due to inaccuracy of assembly has been corrected by, after once by trially shifting the light emitting element or light receiving sensor so that an appropriate output signal is issued for an object of a predetermined distance.

However, the adjustment operation mentioned above needs very fine movement of the light receiving sensor and the light emitting element. As microscopic movement mechanism have to be set up in the apparatus, the adjustment operation is complicated operation and much attention have to be paid for the complicated operation.

In order to solve the above-mentioned problem, for example, a proposal disclosed in Gazette of Patent unexamined Publication No. Sho 60-211412 issued Oct. 23, 1985 has been made. Therein, a distance detecting apparatus for adjusting the above-mentioned slippage through electrical adjustment is disclosed.

In the above-mentioned prior art shown FIG. 1, a position sensitive detector (PSD) is used as light receiving sensor; and a variable resistor is connected in an electric path of anode $A_2$. The beam spot S moves farther away from the electrical center as the object comes nearer. FIG. 1, shows a state that the electrical center C of position sensitive detector PSD 1 is shifted from the optical axis L of the light-receiving optical system (not shown) to the side of an anode $A_1$.

As in FIG. 1, a variable resistor is connected to the side of anode $A_2$. When a resistor which is connected between beam spot S and anode $A_1$ has a resistance $R_1$, and a resistor which is connected between the beam spot S and anode $A_2$ has a resistance $R_2$, and the above-mentioned variable resistor 2 has a resistance $R_3$, the ratio $I_1/I_2$ of the photocurrents $I_1$, $I_2$ which are output from anode $A_1$ and anode $A_2$ is given by $$I_1/I_2 = (R_2 + R_3)/R_1 \qquad (1)$$

Therefore, as a beam spot S moves near an optical axis away from anode $A_1$, the above-mentioned resistance $R_2$ decreases, and resistance $R_1$ increases. For the same reason, the ratio $I_1/I_2$ decreases, and when an object is at infinite distant position on an optical axis, the beam spot becomes smallest.

By setting the above-mentioned resistance $R_3$ of variable resistor 2 where the ratio $I_1/I_2$ is 1, the position of the spot on the optical axis at that time can be deemed as the substantial electrical center of position sensitive detectors PSD 1. In other words, by the simple electrical operation of adjusting the resistance $R_3$ of variable resistor 2 the electrical center of a PSD 1 can be shifted to the side of anode $A_2$.

In the above-mentioned prior art apparatus, there has been an inconvenience in some cases wherein the electrical adjustment can not necessarily be made. For example, when the electrical center of PSD 1 is positioned at the longer distance side with respect to the optical axis of the light receiving optical system, the adjustment can not be made since the variable resistor is connected in the path wherein a signal of long distance side passes. That is, the adjustment can not be made when an electrical center C is shifted to the side opposite to the case shown in FIG. 1.

Furthermore, as disclosed in FIG. 1, publication, the variable resistor is connected in the path wherein the signal of long distance side passes. Therefore, an effective light receiving face changes equivalently, and makes the inconvenience that the gradation of output characteristic curve of PSD 1 is undesirably changes.

Namely, in the above-mentioned prior art apparatus needed, some means for adjustment for changing gradation of the characteristic.

OBJECT AND SUMMARY OF THE INVENTION

Accordingly, it is an object of the present invention to provide a distance detecting apparatus which is adjustable to correct a slippage or shifting of the setting position of electrical center of light receiving sensor or PSD and so on with respect to an optical axis of a light receiving system by very simple operation.

In summary, this and other objects will become apparent from the following description and drawings.

The distance detecting apparatus in accordance with the present invention comprises:
- a light receiving sensor for outputting a first photo-current and a second photo-current corresponding to an incident position of light reflected from an object onto the light receiving sensor;
- photo-current conversion means including an integrating capacitor, for converting said first and second photo-currents into a time-based signal by charging or discharging said integrating capacitor utilizing a first control-current and a second control-current corresponding to a level of said first and second photo-currents, respectively;

current control means connected in parallel with the integrating capacitor for controlling charging or discharging of said integrating capacitor without changing a ratio of the amplitude of the first control-current over the amplitude of the second control-current; and comparison means for comparing said time-based signal to a reference voltage and outputting comparison data indicative of said comparison.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
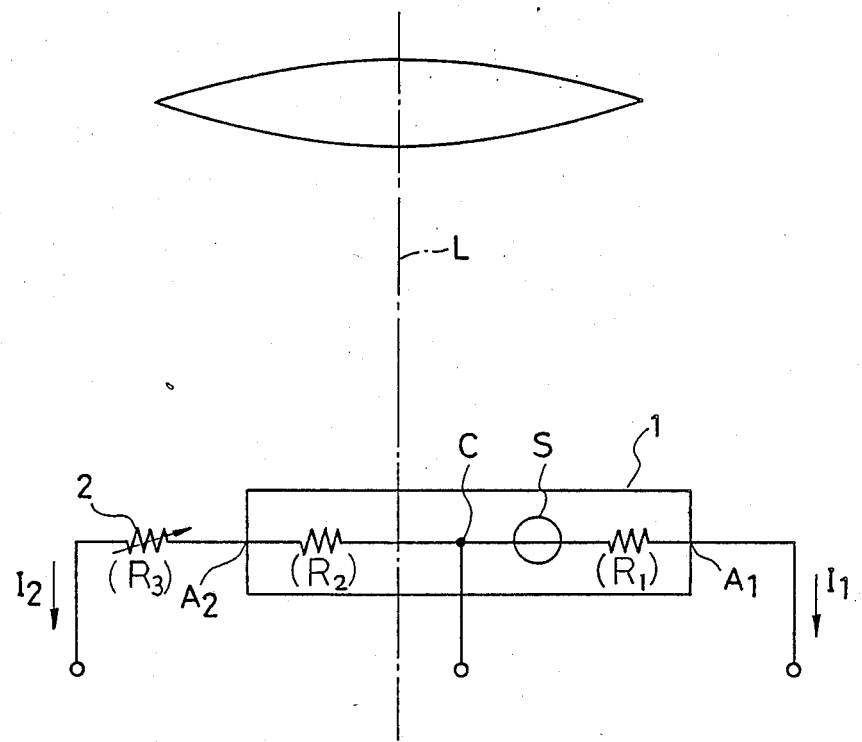
FIG. 1 is a prior art connection diagram which is shown in the Japanese Gazette of Patent Unexamined Publication No. Sho 60-211412 issued Oct. 23, 1985.
Figure 2:
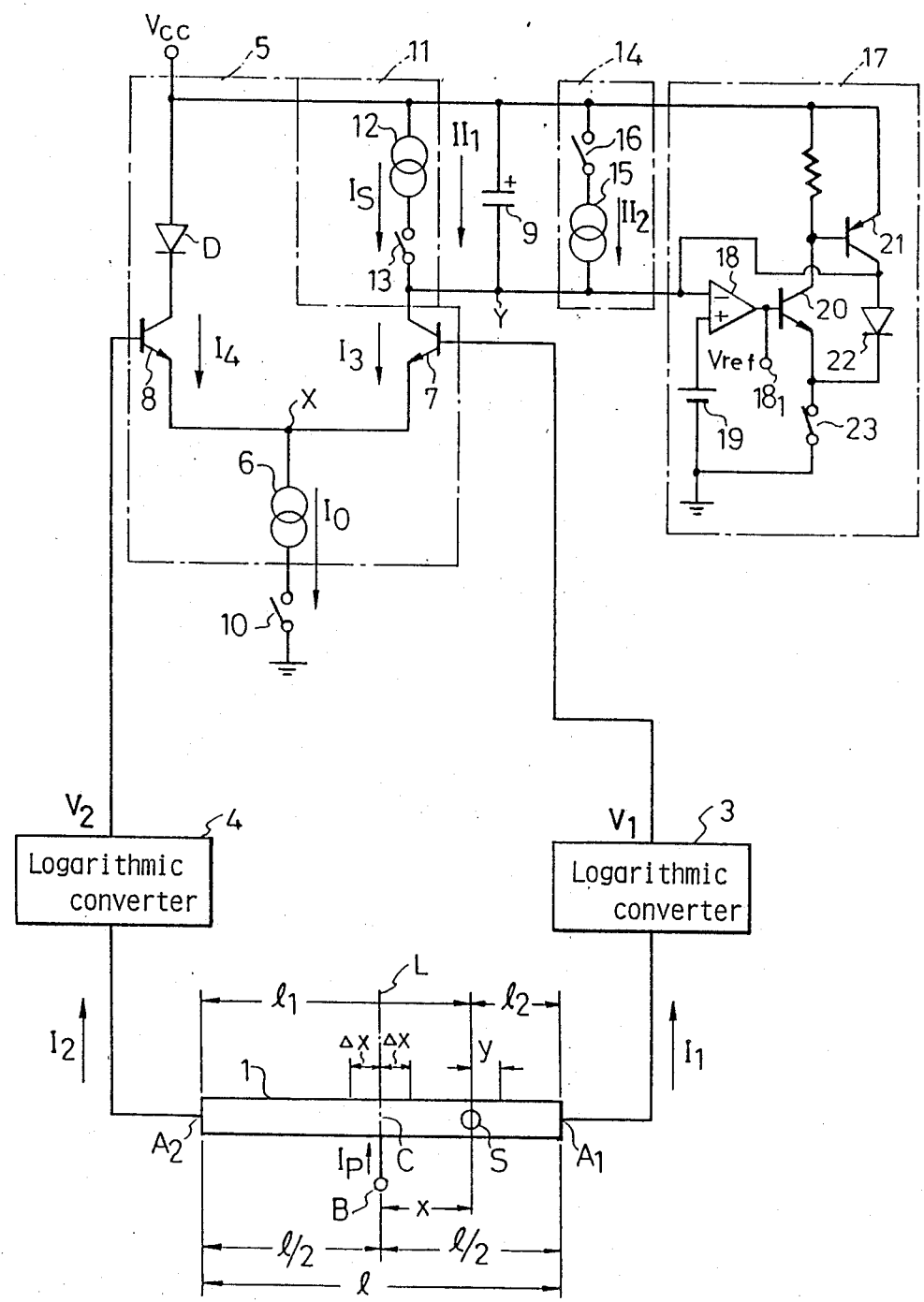
FIG. 2 is a connection diagram of one example of distance detecting apparatus embodying the present invention.

FIG. 2 is a connection diagram showing one embodiment of the distance detecting apparatus of the present invention. Corresponding parts and components in FIG. 1 and FIG. 2 are shown by the same numerals and marks, and the description thereon made of FIG. 1 similarly applies.

As is obvious from FIG. 2, this embodiment uses PSD 1 as light receiving sensor, and uses a first and a second logarithmic converter 3 and 4, which separates two photo-currents $I_1$ and $I_2$ output from PSD 1 respectively from ambient light and amplifies the respective currents converting them into logarithmic voltage.

Output voltage $V_1$ and $V_2$ of the first and the second logarithmic converter 3, 4, respectively are impressed on the bases of the first and the second transistors 7, 8, respectively of the a current coupling means 5. In the embodiment, the current coupling means 5 comprises a third constant current source 6 wherein a given constant current $I_0$ is set and output. The emitters of the first and the second transistor 7, 8 are connected in common to the above-mentioned third constant current source 6. The collector of the transistor 8 is connected through a diode D to the positive voltage source $V_{CC}$. The collector of the transistor 7 is connected through a charge-current control circuit 11 to the positive voltage source $V_{CC}$.

An integrating capacitor 9 is connected between the positive source voltage $V_{CC}$ and, the collector of first transistor 7 in the current coupling means 5. The emitter of transistor 7 is connected to ground through the third constant current source 6 and the first switch 10.

The first switch 10 is controlled so as to alternately change over after a given period of time. Therefore the integrating capacitor 9 is charged for a given period of time in the polarity as shown by + − marks.

Respective ends of the integrating capacitor 9 are connected to respective ends of a charge-current control circuit 11. The charge-current control circuit 11 comprises the first constant current source 12 which sets and outputs the given current and the second switch 13 which is to be operated in synchronism with the first switch 10. The first constant current source 12 is connected in series with the second switch 13 between VCC and the collector of transistor 7.

The respective ends of the integrating capacitor 9 are also connected to respective ends of a discharge-current control circuit 14. The discharge-current control circuit 14 comprises a second constant current source 15 which sets and output a constant current, and a third switch 16 which is to be operated in synchronism with the first switch 10. Third switch 16 is activated for a period of time which is considered time necessary for measurement of distance. The second constant current source 15 is connected in series to the third switch 16. In this embodiment, the first switch 10 is turned off when the third switch 16 is turned on. This causes the integrating capacitor 9 to discharge by the constant current $II_2$ which is given by the third constant current source 15. The integrating capacitor 9 is operated to discharge for a period of time corresponding to the distance of the object.

Still furthermore, to the integrating capacitor 9 is connected a comparison means 17 which comprises comparator 18, a reference level power source 19, transistors 20, 21, diode 22 and a control switch 23. The control switch 23 can only be changed to an ON state when all of the three switches 10, 13, 16 are in OFF state.

When the first switch 10 and the third switch 16 are in OFF state and the control switch 23 is kept ON, the comparison means 17 is operated, thereby setting a reference level voltage $V_{ref}$ to serve as reference level of charging and discharging operation of the integrating capacitor 9.

Operation of the above-mentioned apparatus is as follows:

When a power source voltage $V_{CC}$ is applied, the comparison means 17 is operated by turning on the control switch 23, the electric potential at point Y in FIG. 2 is set to an appropriate reference level voltage $V_{ref}$ which is lower than the power source voltage $V_{CC}$ supplied by the reference level power source 19.

In other words, when the electric potential at point Y is lower than the reference level voltage $V_{ref}$, the comparator 18 outputs a high level signal that turns on the transistors 20, 21, thereby impressing the power source voltage $V_{CC}$ to the above-mentioned point Y through the transistor 21. On the other hand, when the electrical potential at point Y becomes higher than the reference level voltage $V_{ref}$, the comparator 18 outputs low level signal, thereby turning off the transistors 20, 21, and so the power source voltage $V_{CC}$ is not applied to point Y. Thereafter, the comparison means 17 having the comparator 18 repeats the above-mentioned operation. Thus, the electric potential at point Y is compared to the reference level voltage $V_{ref}$.

For the simplicity of explanation, it is provided that the optical center is placed at the half point ($\frac{1}{2}\cdot l$ from both ends) of the effective light receiving surface length l of the position sensitive detector PSD 1. The beam spot S which is made by reflection of light from the light emitting device (not shown) from the object is in a position a distance X from the optical center of PSD 1, as shown in FIG. 2. The PSD 1 outputs two photo-currents $I_1$ and $I_2$ corresponding to the distance of the object. One photo-current $I_1$ is output from one anode $A_1$ of PSD 1 while the second photo-current $I_2$ is output from anode $A_2$. The closer the object, the nearer the above-mentioned beam spot S slides toward the anode $A_1$ of PSD 1, and the smaller $I_2$ becomes in relation to $I_1$. The relationship is given by the following formulas:

$$I_1 = I_p \times \frac{\frac{l}{2}+x}{l} = I_p \times \frac{l_1}{l}, \qquad (1)$$

$$I_2 = I_p \times \frac{\frac{l}{2}-x}{l} = I_p \times \frac{l_2}{l}, \qquad (2)$$

where, $I_p$ is electric current flowing into cathode B.

The above-mentioned photo-current $I_1$ and $I_2$ are input to the first and the second logarithmic converters 3 and 4, which separate the respective photo-currents $I_1$ and $I_2$ from ambient light and amplify them Z times, and furthermore convert them to logarithmic voltages.

The above-mentioned logarithmic converters 3 and 4 output the first and the second output voltages $V_1$ and $V_2$ respectively given by the following formulas.

$$V_1 = V_B - K \ln \frac{ZI_1}{I_D}, \qquad (3)$$

$$V_2 = V_B - K \ln \frac{ZI_2}{I_D}, \qquad (4)$$

where, $V_B$ is a bias voltage, $I_D$ is reverse saturation current of logarithmic compression diode and K is a constant.

The first and the second output voltages $V_1$ and $V_2$ are applied to the bases of the first and the second transistors 7 and 8 in the current coupling means 5, respectively. When the first switch is placed in the ON state, the shunt circuit 5 is operated. The shunt circuit 5 divides the constant current $I_0$ output by the first constant current source 6 into the two control-currents $I_3$, $I_4$ corresponding to the output voltages $V_1$ and $V_2$ respectively. The current coupling means 5 creates the first and the second control-currents $I_3$, $I_4$ separated in the same current ratio as the ratio of the output voltage $V_1$ and $V_2$.

Thus, relation of $$I_3 + I_4 = I_0,$$

$$I_3/I_4 = V_1 - V_B/V_2 - V_B \qquad (4\text{-}1),$$

holds for the first and the second currents $I_3$, $I_4$ which flow through the transistors 7, 8.

The current coupling means 5 is connected to the power source voltage $V_{CC}$. The integrating capacitor 9 and charge-current control circuit 11 are also connected to VCC. The second switch 13 in the charge-current control circuit 11 is actuated together with the first switch 10, and the control switch 23 is turned OFF in synchronism with turning ON of the first switch 10, and second switch 13. Therefore comparison circuit 17 is in non-operation state when the current coupling means 5 and charge-current control circuit 11 are operating. The first control-current $I_3$ is represented by the following formula:

$$I_3 = II_1 + I_S \qquad (5),$$

where $II_1$ is the current flowing into the integrating capacitor 9, $I_S$ is the constant current which is output from the second constant current source 12 and flows through the second switch 13.

In this embodiment it is clear that, when the first and the second output voltages $V_1$, $V_2$ are applied and the first, the second switches are turned ON and the control switch 23 is turned OFF, the integrating capacitor 9 is charged as shown by the + − marks in FIG. 2 and a "first integration operation" by a first integration current $II_1$ takes place as the charging occurs.

In this embodiment, the above-mentioned first switch 10 is kept ON for given period of time $T_1$.

Therefore, the first integration operation by charging the first integrating current $II_1(=I_3-I_S)$ to integrating capacitor 9 is made for the above-mentioned given period of the time $T_1$.

After elapse of the above-mentioned given period of the time $T_1$, when the first and the second switches 10 and 13 are turned OFF, the third switch 16 in the discharge-current control circuit 14 turns ON for an appropriate period of the time. And the integrating capacitor 9 carries out a "second integration operation" of turning-ON of the third switch 16. In the second integration operation, the integral capacitor 9 discharges the electric charge which has been previously charged by the first integral current $II_1$, the discharge is made at a rate determined by second integral current $II_2$ which is determined by the second constant current source 15. During this time, of course, the control switch 23 is kept in OFF state.

Figure 3:
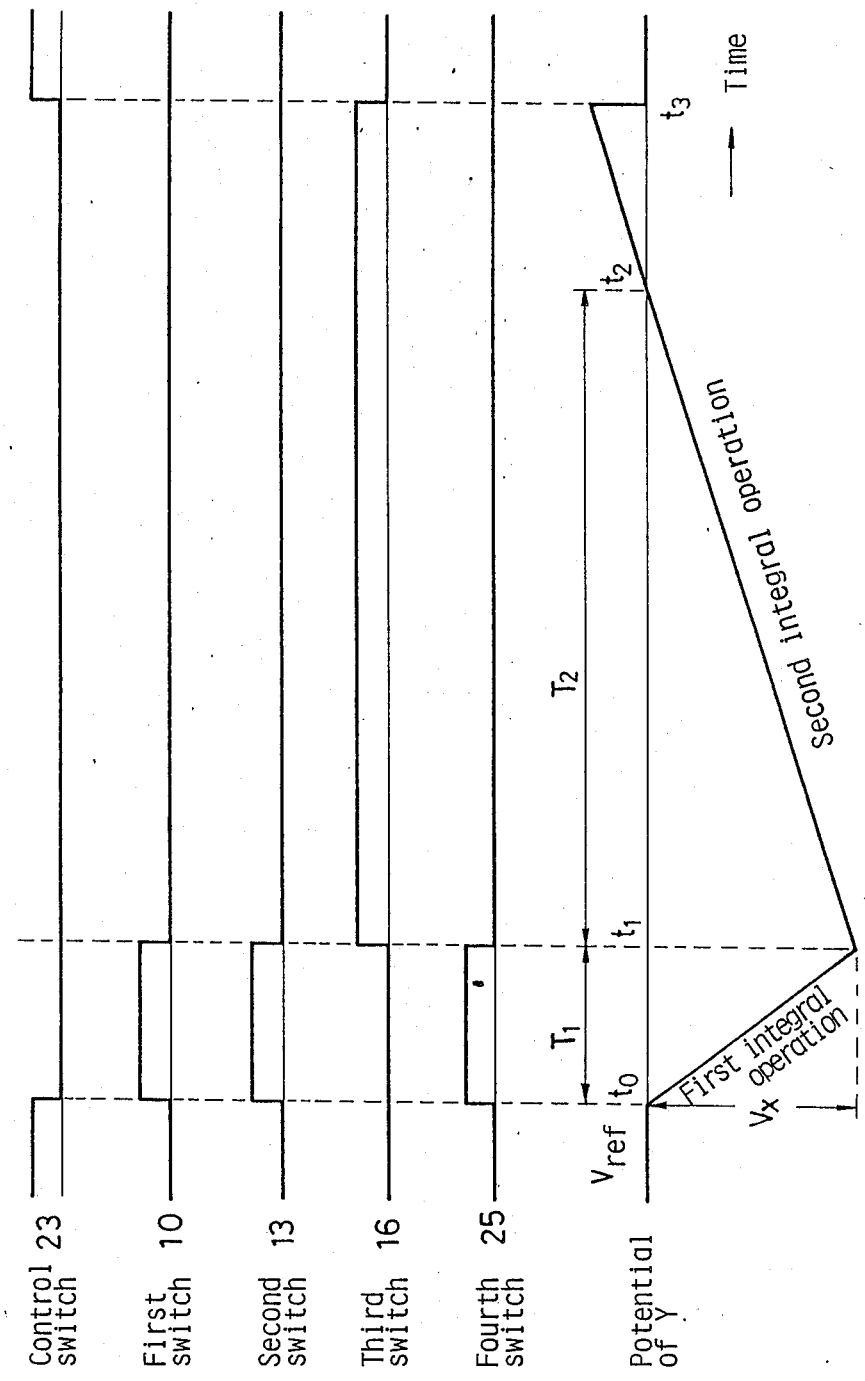
FIG. 3 is a voltage-waveform chart of change of voltage at point Y in FIG. 2.

In illustration of the above, change of the duration of this second integration operation corresponds to the distance of the object and an accurate measurement can be made thereby electric potential at point Y is shown by curve Y in FIG. 3 with respect to the reference voltage $V_{ref}$.

In FIG. 3, the point of time $t_0$ is the moment of turning ON of the first and the second switches 10 and 13. The point of time $t_1$ is the moment of turning ON of the third switch 16 after elapse of the given time period $T_1$. The point of time $t_2$ is the moment of reversal of the output of the comparator 18 when the electric potential at point Y arises to the reference voltage $V_{ref}$ by the second integral operation. The moment $t_3$ is the completion of the operation marked by turning OFF of the third switch 16.

Next, let us consider an integral voltage $V_x$ in the integrating capacitor 9 which has been charged in the "first integration operation" during the time period $T_1$ shown in FIG. 3.

The above-mentioned integral voltage $V_x$ is given as follows from the relations of $Q = C \cdot V$, $dQ/dt = i$, $$V_x = \frac{Q}{C_{INT}} = \frac{II_1 \cdot T_1}{C_{INT}} = \frac{(I_3 - I_S) \cdot T_1}{C_{INT}}, \quad (6)$$

where $C_{INT}$ is capacity of the integrating capacitor 9.

On the other hand, when the electric potential at point X in FIG. 2 is $V_{10}$, the following relation of voltage and current holds among voltages $V_{BE7}$ and $V_{BE8}$ (which exist between respective bases and emitters of the first and the second transistors 7 and 8) the first and the second output voltages $V_1$ and $V_2$, and the first and the second currents $I_3$ and $I_4$:

$$V_{BE7} = V_1 - V_{10} = K \ln I_3/I_D \quad (7),$$

$$V_{BE8} = V_2 - V_{10} = K \ln I_4/I_D \quad (8).$$

The following formulas are obtainable by substituting $V_1$ and $V_2$ of formulas (3) and (4) in the above-mentioned formulas (7) and (8):

$$\begin{aligned}
V_{BE7} &= V_B - K\ln\frac{ZI_1}{I_D} - V_{IO} = K\ln\frac{I_3}{I_D} \\
\therefore\ V_B - V_{IO} &= K\left(\ln\frac{ZI_1}{I_D} + \ln\frac{I_3}{I_D}\right) \\
\therefore\ \frac{V_B - V_{IO}}{K} &= \ln\frac{ZI_1 \cdot I_3}{I_D^2},
\end{aligned} \quad (9)$$

$$\begin{aligned}
V_{BE8} &= V_B - K\ln\frac{ZI_2}{I_D} - V_{IO} = K\ln\frac{I_4}{I_D} \\
\therefore\ V_B - V_{IO} &= K\left(\ln\frac{ZI_2}{I_D} + \ln\frac{I_4}{I_D}\right) \\
\therefore\ \frac{V_B - V_{IO}}{K} &= \ln\frac{ZI_2 \cdot I_4}{I_D^2}.
\end{aligned} \quad (10)$$

Since the left sides of the formulas (9) and (10) are equal to each other, the following holds:

$$\ln\frac{ZI_1 \cdot I_3}{I_D^2} = \ln\frac{ZI_2 \cdot I_4}{I_D^2}$$

Therefore, $$I_1 \cdot I_3 = I_2 \cdot I_4 \quad (11).$$

As $I_3 + I_4 = I_0$ as mentioned above, by transformation of the above-mentioned formula (11), $I_1 \cdot I_3 = I_2 \cdot (I_0 - I_3)$ holds. Therefrom $I_3$ is given as follows:

$$I_3 = \frac{I_2}{I_1 + I_2} \cdot I_0. \quad (11-1)$$

By substituting the formulas (1) and (2) in the above-mentioned formula (11-1) the following relation holds:

$$I_3 = \frac{I_p \frac{l_2}{l}}{I_p \frac{l_1}{l} + I_p \frac{l_2}{l}} \cdot I_0 = \frac{I_p \frac{l_2}{l}}{I_p\left(\frac{l_1}{l} + \frac{l_2}{l}\right)} \cdot I_0 = \quad (12)$$

$$\frac{l_2}{l} \cdot I_0 = \frac{\frac{l}{2} - x}{l} \cdot I_0.$$

Therefore, the above-mentioned formulas (6) can be transformed as follows:

$$V_x = \frac{\left(\frac{\frac{l}{2} - x}{l} \cdot I_0 - I_S\right) \cdot T_1}{C_{INT}}, \quad (13)$$

Thus, the integral voltage $V_x$ obtained by the first integration operation becomes the voltage which corresponds to the incident position X of the beam spot S on the PSD 1. As a result, it becomes clear that, by operating the above-mentioned first integration operation, the integral voltage $V_x$ can be used as distance data of an object by previously setting the values $I_0$, $C_{INT}$ etc. to given values.

Furthermore, by carrying out the second integration operation, which is a discharge at a constant current to the above-mentioned integral voltage $V_x$, the above-mentioned integral voltage $V_x$ is transformed to the time signal designated by $T_2$ in FIG. 3.

Therefore, by detection of the moment of the inversion after each finishing of the first integration operation at the output of the terminal $18_1$ of comparator 18, the time period $T_2$ is given and it can be used as distance data of an object.

In the case where the optical center of PSD 1 and optical axis differ by $\Delta X$ as shown in FIG. 2 due to shifting, of the optical axis to the side of anode $A_1$ or the side of anode $A_2$ of PSD 1, operation is elucidated as follows.

For the same object as above, the light incident position or beam spot S is apart by a distance x from the optical axis L. Thereby, integral voltage $V_x$, of integrating capacitor 9, which is given by the first integration operation and represented by the formula (13), is as follows:

$$V_{x'} = \frac{\left(\frac{\frac{l}{2} - x \pm \Delta x}{l} \cdot I_0 - I_S\right) \cdot T_1}{C_{INT}}. \quad (14)$$

Provided that $I_s$ in formula (14) is equal to the aforementioned case or does not exist, the above-mentioned integrated voltage $V_{x'}$ is different from the integrated voltage $V_x$ by the above-mentioned setting error $\pm\Delta x$ though the object is at the same distance. So, the above-mentioned value of $V_{x'}$ cannot be used as accurate distance data.

However, in the present invention, the current $I_s$ output by the charge-current control circuit is variable, and is included in formula (14). Therefore, by outputting an adjusted current $I_{S'}$ as opposed to $I_S$, the effect of the setting error $\pm\Delta x$ in the formula (14) is eliminated.

More detailed description is given in the following.

A distance of an object is defined as distance $D_0$ when the optical center C of PSD 1 and optical axis L coincide in the system as above mentioned. Take as a reference that state wherein the incident position of beam spot S is apart by a distance x from the optical axis L. The integral voltage $V_x$ made by the first integration operation in indicated formula (13) can be adjusted to voltage $V_0$ by adjusting the constant current $I_S$ which is output by the constant current source 12. The first integral current $II_1$, flowing into the integral capacitor 9, is given as follows by considering that the first integration operation period $T_1$ is a constant time period:

$$II_1 = I_3 - I_S = \frac{C_{INT} \cdot V_O}{T_1}. \tag{15}$$

And, the formula (12) is transformed as follows.

$$I_3 = \frac{\frac{l}{2} - x}{l} \cdot I_O = \frac{l_2}{l} I_O. \tag{12'}$$

Hence, the adjusted constant current $I_S$ is given as follows from the formulas (15) and (12):

$$I_S = I_3 - II_1 = \frac{l_2}{l} \cdot I_O - \frac{C_{INT} \cdot V_O}{T_1}. \tag{16}$$

In contrast, assume a case where on an object of distance $D_y$ reflects light. The incident position of a beam spot S on the PSD 1 shifts by distance y to the side of anode $A_1$ of PSD 1, and the first current $I_{3y}$ flowing into the first transistor 7 at that moment is given as follows:

$$I_{3y} = I_O \frac{l_2 - y}{l}. \tag{17}$$

In the same way, the first integral current $II_{1y}$ at this time is given as follows from the above-mentioned formulas (15) and (17):

$$II_{1y} = I_{3y} - I_S = I_O \frac{l_2 - y}{l} - I_O \frac{l_2}{l} + \frac{C_{INT} \cdot V_O}{T_1} \tag{18}$$
$$= \frac{C_{INT} \cdot V_O}{T_1} - \frac{y}{l} I_O.$$

Furthermore, the integral voltage $V_y$ at this time is given as follows from the formula (6):

$$V_y = \frac{II_{1y} \cdot T_1}{C_{INT}} = \frac{T_1}{C_{INT}} \left( \frac{C_{INT} \cdot V_O}{T_1} - \frac{y}{l} I_O \right) \tag{19}$$
$$= V_O - \frac{T_1 \cdot y \cdot I_O}{C_{INT} \cdot l}.$$

Next, a case where the optical center C of PSD 1 shifts by distance $\pm \Delta x$ from the optical axis L is considered. When the integral voltage $V_x$ from the first integration operation if the object reference distance is $D_0$ the reference voltage $V_0$ is obtained by adjusting the constant current $I_s$ to $I_s'$. The first integral current $II_1'$ is given as follows:

$$II_{1'} = I_{3'} - I_S = \frac{C_{INT} \cdot V_O}{T_1}, \tag{20}$$

and this is similar to that of (15) as a matter of course.

At this time, the current $I_3'$ flowing into the first transistor 7 is given as follows from the above-mentioned formula (12) and distance $\pm \Delta x$.

$$I_{3'} = I_O \frac{l_2 \pm \Delta x}{l}. \tag{21}$$

Therefore, the adjusted constant current $I_s'$ is given as follows from the above-mentioned formulas (20) and (21):

$$I_{S'} = I_{3'} - II_{1'} \tag{22}$$
$$= I_O \frac{l_2 \pm \Delta x}{l} - \frac{C_{INT} \cdot V_O}{T_1}.$$

When light is emitted on an object that is distance $D_y$ by an object in the afore-mentioned way, distance of shift of beam spot S on the PSD 1 is y the same as the afore-mentioned. By this reason, the current $I_{3y}'$ that is flowing in the first transistor 7 is as follows:

$$I_{3y'} = I_O \frac{l_2 \pm \Delta x - y}{l}. \tag{23}$$

And, the first integral current $II_{1y}'$ is given as follows from the above-mentioned formulas (22) and (23):

$$II_{1y'} = I_{3y'} - I_{S'} = I_O \frac{l_2 \pm \Delta x - y}{l} - \left( I_O \frac{l_2 \pm \Delta x}{l} - \frac{C_{INT} \cdot V_O}{T_1} \right) \tag{24}$$
$$= \frac{C_{INT} \cdot V_O}{T_1} - \frac{y}{l} I_O.$$

Thus, the integral voltage $V_y'$ is given as follows.

$$V_{y'} = \frac{T_1}{C_{INT}} \cdot II_{1y'} = \frac{T_1}{C_{INT}} \left( \frac{C_{INT} \cdot V_O}{T_1} - \frac{y}{l} I_O \right) \tag{25}$$
$$= V_O - \frac{T_1 \cdot y \cdot I_O}{C_{INT} \cdot l}.$$

Thus the integral voltage $V_y'$ becomes equal to the integral voltage $V_y$ indicated in the formula (19). That is $$V_y' = V_y.$$

In other words when the electrical center C of PSD 1 shifts from optical axis L, the integrated voltage $V_y'$ obtained by the first integration operation can be made equal to the integrated voltage $V_y$ for non-shift case by controlling the constant current $I_s$. Given this, the above-mentioned integral voltage $V_y'$ yields accurate distance information of the object, just as the original integral voltage $V_y$. As the result, measurement error due to the above-mentioned mentioned slippage is eliminated completely.

In brief, by adjusting the constant current Is (set when the electrical center C agree with optical axis L) to an adjusted constant Is' corresponding to the shift, the optical shift of the electrical center C can be corrected electrically.

Now, let us express the adjusted constant current Is' as a function of the calibrated constant current Is as follows:

$$I_{S'} = \frac{\pm \Delta x}{l} I_O + I_S.$$

The following description deals with relationship between time signal $T_2$ in the second integral operation and the distance of the object, in the embodiment heretofore described.

The embodiment in FIG. 2 shows that integral capacitor 9 will charge to a level determined by first control-current Is, which in turn corresponds in a loop circuit of the first current $I_3$ in with output photo-current $I_1$ from the side of anode $A_1$, which is determinative of the light incident position or beam spot of an object. Similarly, discharging of capacitor 9 will occur at a rate determined by known current $I_{12}$ between the above-mentioned time signal $T_2$ and distance of an object assumes the characteristic curve shown in FIG. 4.

Consideration must be made of the influence on the above-mentioned characteristic due to change of the constant current Is, which is the output of the first constant current sourced 12. The value of the first integral current $II_1$, which flows into the integral capacitor 9 can be changed without affecting the ratio of the first control-current $I_3$ and the second control-current $I_4$. This is because the constant current Is allows parallel shifting of the characteristic curve in the graph of FIG. 4 as indicated by arrow "f" or arrow "g". As a result of the parallel shifting the characteristic curves, the set position of PSD 1 can be electrically calibrated.

Figure 4:
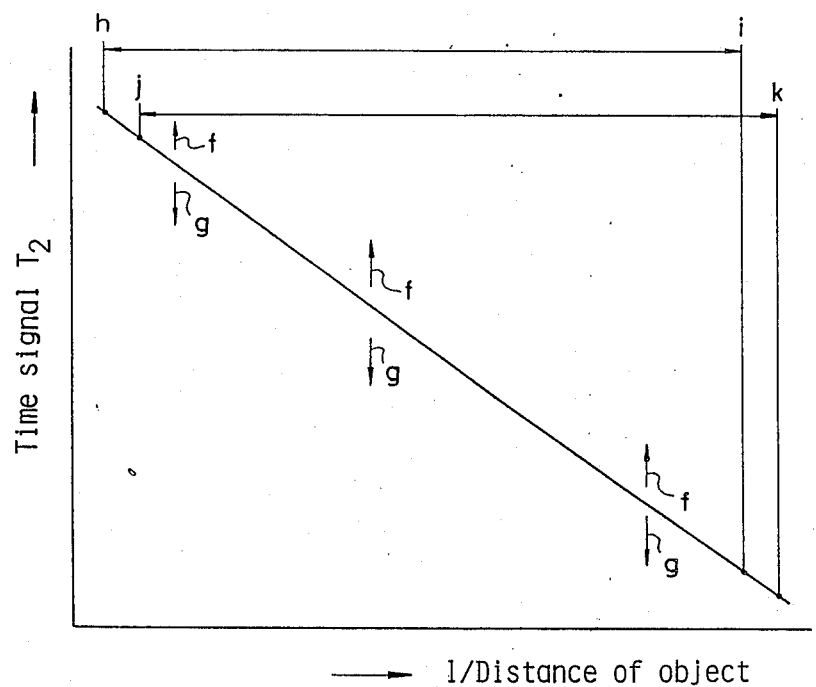
FIG. 4 is a characteristic graph of the relation between the distance of an object and time signal designated by $T_2$ in FIG. 3.

When the shift of setting position of PSD 1 takes place, the curve in the characteristic curve in FIG. 4 moves in the horizontal direction of FIG. 4. During calibration the constant current Is is changed, and the curves of the graph move in the direction parallel to that of the arrows "f" or "g". Since both the above-mentioned movements of the graph result in substantially the same result, the shift is compensated by the change in the constant current Is.

In the above-mentioned embodiment, each constant current $I_0$ and $II_2$, which are output from the first constant current source 6 and the third constant current source 15, respectively, are previously set. Hereafter, a second embodiment described wherein the constant currents $I_0$ and $II_2$ can be controlled besides the above-mentioned constant current Is. In such modified case, the characteristic graph in FIG. 4 is controlled as will be explained.

When the constant current $I_0$ which is outputted from the third constant current source 6 is changed, the slope of curves in the characteristic graph in FIG. 4 is changed. and, when the constant current $II_2$ outputted from the second constant current source 15 is changed, the usable range of curves in the characteristic graph is changed. That is, a selection can be made in the range of from h to i, or j to k in FIG. 4. for use as a distance signal.

In a third embodiment, the above-mentioned integrating capacitor 9 and and charge-current control circuit and so on may be provided in the loop wherein the second current $I_4$ flows. Then, the similar operation and function to the above-mentioned example is obtainable. In this embodiment, the time signal $T_2$ and the distance of an object relationship in FIG. 4 is obtainable although the relationship between the time signal $T_2$ and the distance of object is inverse to the above-mentioned example.

In all the described embodiments, the double integral operation and the charge-current control circuit 11 (which is for controlling the first integral current for the first integral operation) can be adjusted. Thus, any shift of setting position of PSD 1 can be compensated by a simple electrical adjustment made by controlling the current in the power source shifting device to proper value.

Next, the adjusting operation to electrically compensate the shifting of PSD 1 is described in detail.

When the characteristic curve showing relation between the time signal and the distance of object has an appropriate slope as shown in FIG. 4, the shift of PSD 1 can be compensated only by adjusting the constant current Is, that is only by parallel movement of the curve on the characteristics graph.

On the other hand, depending on dispersion of characteristics PSD 1 and the various electrical components used in the circut, the slope of the characteristics curve is liable to change from to a less preferable slope. When the above-mentioned change of inclination takes place, it can not be corrected solely by changing the constant current Is. In this case, the constant current $I_0$ must be changed in addition to changing the constant current Is. In this way, the characteristic slope is corrected to a preferable one and the characteristic curve can be parallel-shifted to a preferable position.

The inventor experimentally confirmed that, a center of rotation of the characteristic curves at adjustment of inclination differs depending on the kind of PSD 1 used the various electrical components, and the change in value of the constant current $I_S$. As a result, the above-mentioned correcting operation requires complicated procedures.

Figure 5A:
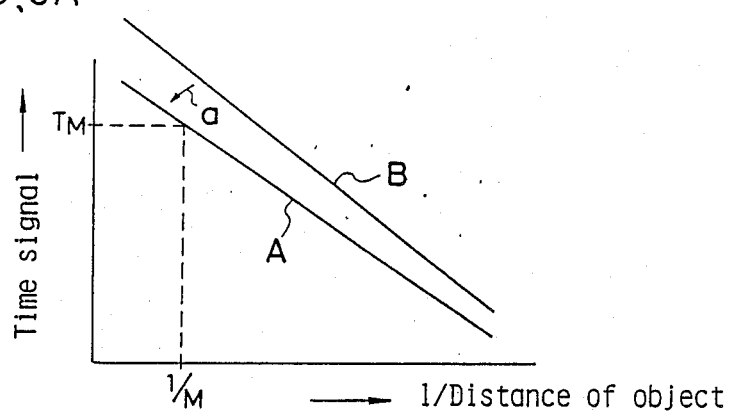
FIG. 5A, FIG. 5B and FIG. 5C are characteristic graphs similar to FIG. 4 for explanation of adjusting of slippage or shifting of a set position of PSD which shown in embodiment of FIG. 2.
Figure 5B:
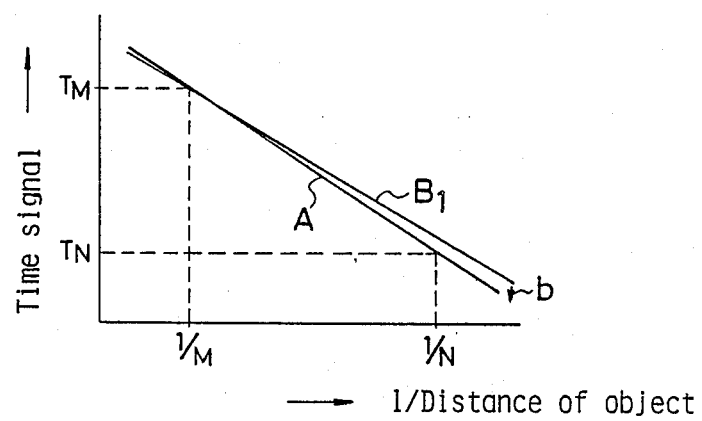
Figure 5C:
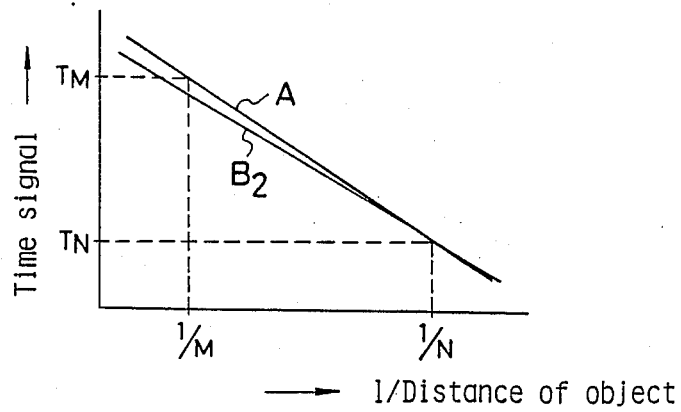

The following detailed description deals at this point with reference to FIG. 5A, FIG. 5B and FIG. 5C. In FIG. 5A, it is of a provided that the characteristic curve A is preferable and desirable characteristic and that characteristic B is to be corrected. The correcting operation involves moving the characteristic curve B so to coincide with the characteristic curve A. First, the time signal $T_M$ for a distance M of an object in characteristic curve B is made to shift by adjusting the constant current $I_0$. As a result, the characteristic curve B is rotated around a certain center of rotation to an inclination which is indicated arrow "a" in FIG. 5A, thereby changing the slope of the characteristic curve B. In FIG. 5B, the characteristic curve $B_1$ is a curve made by rotation of the characteristic curve B of FIG. 5A to a direction indicted by arrow "a" in FIG. 5A. At the next time, $T_N$ (corresponding to distance n of an object) on the characteristic curve $B_1$ is made to move by adjustment of the constant current Is. As a result, the characteristic curve $B_1$ is moved to the position parallel to direction indicated by arrow b. At the same time, the center of rotation in FIG. 5B is moved to a different position from the center of rotation in FIG. 5A.

In FIG. 5C, the characteristic curve B2 is made by moving to the characteristic curve B1 in parallel to a direction which is indicated arrow "b" in FIG. 5B. In FIG. 5C, the time $T_M$ corresponding to distance M of an object is shorter than in case of previously mentioned in FIG. 5A.

In FIG. 5C, the time signal $T_M$ for a distance M of an object on the characteristic curve B2 is then rotated by adjustment of the constant current $I_0$ to a preferable characteristic from the characteristic curve A. When this is done, the center of rotation in FIG. 5C is changed to a different point from the previous center of rotation of FIG. 5A. As a result, the characteristic curve B2 center of rotation moves closer to that in the characteristic curve A.

Thereafter, adjustments by parallel movement of the characteristic curve by adjusting the constant current Is, and rotation of the characteristic curve by adjusting the constant current $I_0$, are made. As a result, the characteristic curve B coincides with characteristic curve A. When this is done, the correction operation is completed.

It can be seen from the above-mentioned example the correcting operation comprises multiple of changes to the constant currents $I_0$ and Is for changing the center of rotation and adjustment of slope of the characteristic curve.

Figure 6:
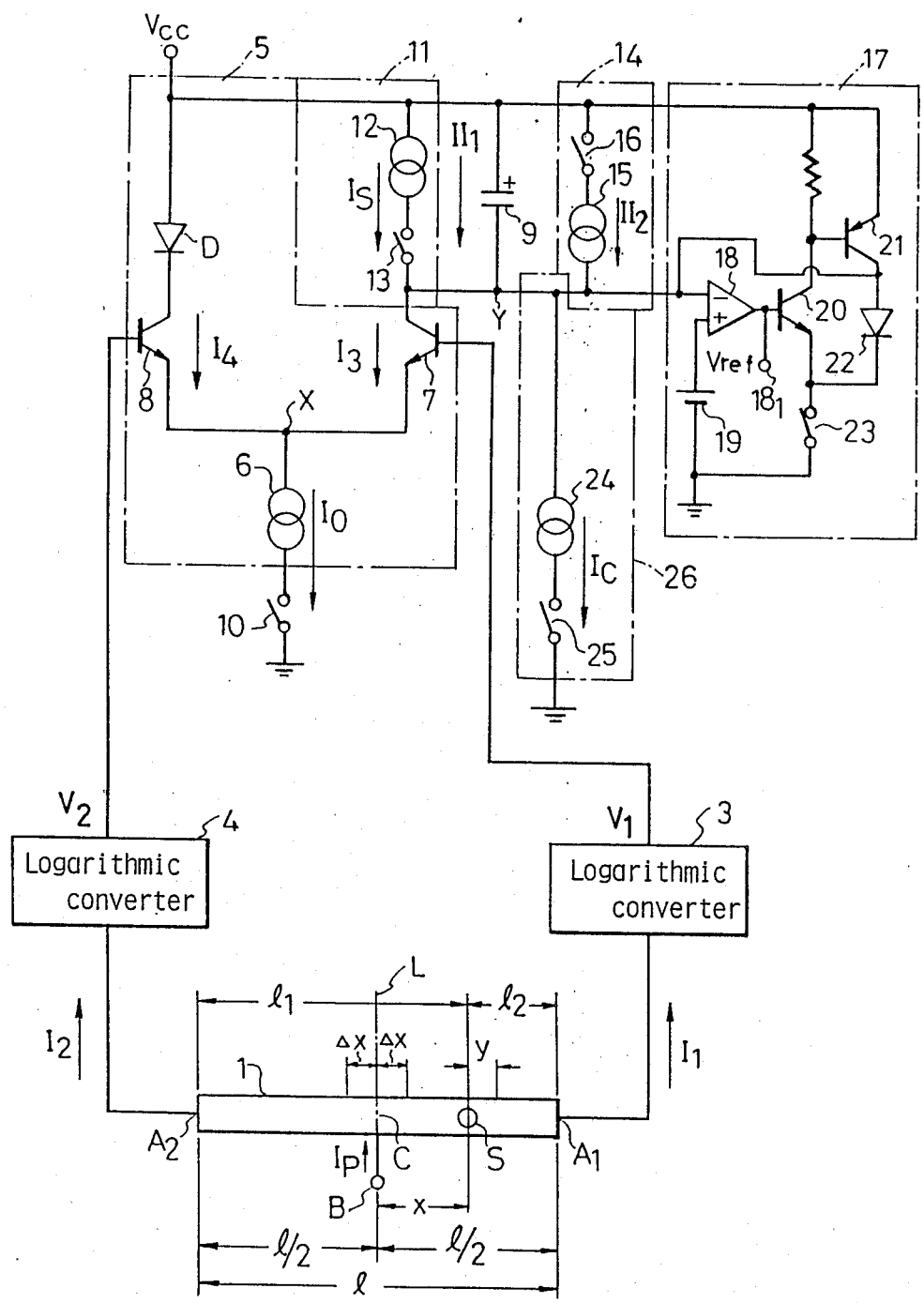
FIG. 6 is a connection diagram showing another embodiment of the distance detecting apparatus embodying the present invention.

FIG. 6 shows a schematic diagram of electric circuit of another preferred embodiment of the invention wherein center of rotation of the characteristic curve in the above-mentioned complicated operation is fixed. Therefore the distance detection apparatus of the present embodiment has a fixed axis of the rotation during the adjusting operation. Corresponding parts and components to the first embodiment of FIG. 2 are shown by the same numerals and marks, and the description thereon made in the first embodiment similarly apply.

The embodiment shown in FIG. 6, has a control circuit 26. The control circuit 26 comprises a fourth constant current source 24 which output a variable constant current Ic and a fourth switch 25 which is to synchronized with the first switch 10 and the second switch 13. When the constant current $I_0$ which is output by the third constant current source 6 is $N \cdot I_A$, the constant current Is which is output by the first constant current source is $I_A$. The ratio of the constant currents $I_0$ is to Is is fixed at N. In other words, even the constant current Is changes, the above-mentioned fixed ratio remains constant.

When the embodiment of FIG. 6 is constituted as per above, the current $I_3$ flowing in the first transistor 7 and the first integral current $II_1$ is represented as follows.

As for the embodiment in FIG. 2, assume the PSD 1 in FIG. 6 is positioned at a right position and the spot S reflected from an object apperas at distance x form the half length ($\frac{1}{2}l$) point of the effective light receiving surface length (l). That is, the light incident position on PSD 1 for the distance Do of an object is at a distance x from the incident position when the object is infinitely far away. In FIG. 2, the current $I_3$ flowing into the first transistor 7 is given as follows, from formula (12) and the conditions of $I_0 = N \cdot A$ and $I_S = I_A$:

$$I_3 = N \cdot I_A \times \frac{\frac{l}{2} - x}{l}. \tag{26}$$

In contrast, in the embodiment of FIG. 6, with a fourth constant current source 24 applied, the above-mentioned the relationship of current $I_3$ and Is is given as:

$$I_3 + I_C = I_S + II_1 \tag{27}.$$

Therefore, the first integral current $II_1$ is indicated as:

$$\begin{aligned} II_1 &= I_3 - I_S + I_C \\ &= N \cdot I_A \frac{\frac{l}{2} - x}{l} - I_A + I_C. \end{aligned} \tag{28}$$

Now a description is made of the second integrated period of time $T_2$ (Do) in the embodiment of FIG. 6 of the invention.

When the first integrated time period is $T_1$ (Do), the capacity of integrating capacitor 9 is $C_{INT}$, the second integrated period of time is $II_2$, and electric charge Q to be charged in and discharged from the integrating capacitor 9 is given from the expressions of $Q = C \cdot V$, $Q = i \cdot T$ as:

$$Q = C_{INT} \cdot V_O = II_1 \times T_1(D_O) \tag{29},$$

$$Q = C_{INT} \cdot V_O = II_2 \times T_2(D_O) \tag{30}.$$

Where, Vo is the first integrated voltage corresponding to the distance Do of an object.

Since left sides of the formulas (29) and (30) are equal to each other, we have:

$$II_1 \times T_1(D_O) = II_2 \times T_2(D_O).$$

The second integrated time period $T_2$ (Do) is given as follows considering the formula (28):

$$T_2(D_O) = \tag{31}$$

$$\frac{II_1}{II_2} \times T_1(D_O) = \frac{\left(N \frac{\frac{l}{2} - x}{l} - 1\right) I_A + I_C}{II_2} \times T_1(D_O).$$

In this equation, when the current $I_A$ in previous formula (31) is changed by $\pm \Delta I_A$, we are left with:

$$T_2'(D_O) = \tag{32}$$

$$\frac{\left(N \frac{\frac{l}{2} - x}{l} - 1\right)(I_A \pm \Delta I_A) + I_C}{II_2} \times T_1(D_O).$$

When, the incident position x of beam spots is positioned as distance Do of an object, and the distance Do is given at the distance $(\frac{1}{2} - 1/N)l$ of PSD 1, where N is ratio of the constant current $I_0$ Is, and the incident position x of beam spot S is indicated $x = (\frac{1}{2} - 1/N)l$, respective second integrated time period $T_2$(Do) and $T_2'$(Do) for distance Do is given in the following formulas (from previous formulas (31) and (32):

$$T_2(D_O) = \frac{\left(N\frac{\frac{l}{2}-\left(\frac{1}{2}-\frac{1}{N}\right)l}{l} - 1\right)I_A + I_C}{II_2} \times T_1(D_O) \quad (33)$$

$$= \frac{I_C}{II_2} \cdot T_1(D_O),$$

$$T_{2'}(D_O) = \frac{I_C}{II_2} \cdot T_1(D_O). \quad (34)$$

The above-mentioned two time periods $T_2(Do)$ and $T_2'(Do)$ are equal to each other irrespective of change of the value of the current $I_A$.

Figure 7:
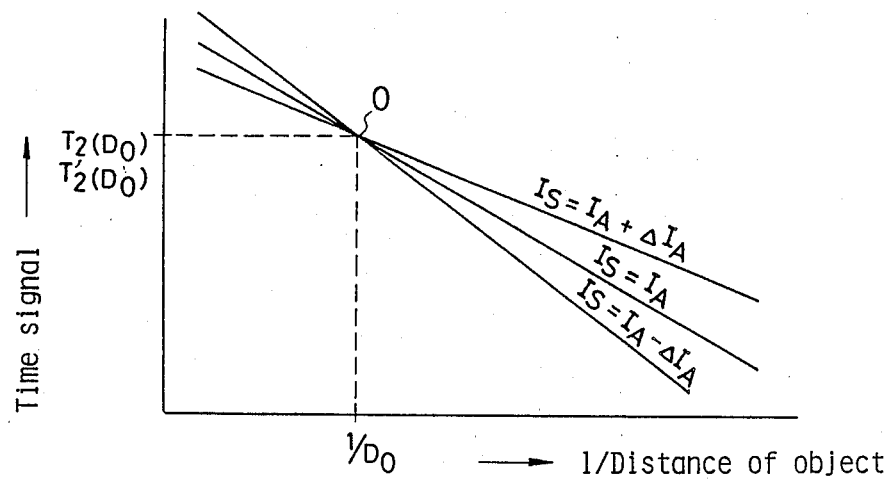
FIG. 7 is a characteristic graph similar to FIG. 4, taking various constant currents $I_S$ as parameter, and under a condition that, in the embodiment of FIG. 6, the distance of an object is $D_O$ when incident position of beam spot is at a distance of $(\frac{1}{2}-1/N)l$ from the center of rightly positioned PSD.

It follows that even if the constant current Is is changed, the time of the second integration operation is not changed. This means that the characteristics curves of FIG. 4 (indicating the relationship between distance of object and time signal) rotates around the point 0 depending on the constant current $I_S$, as shown in FIG. 7. The point 0 is determined the distance Do and time signal $T_2(Do)$ or $T_2'(Do)$. The time signal $T_2$ (Do) for $I_S=I_A$, or $T_2'(Do)$ for $I_S=I_A\pm\Delta I$ can be changed to various slopes around the center point 0 by changing the constant current Is.

In other words, when a specific distance on PSD 1 surface ($\frac{1}{2}-1/N$)l is set, the ratio N of the constant currents Io to Is and the distance Do are decided thereby. And, the value of the time signal $T_2$ (Do) can be adjusted by setting the current Ic and $II_2$ which are indicated in formula (33).

The above-mentioned specific positions of distance on PSD 1 surface is preferably selected as follows. When the number of measuring points is approximately 20, the point of light incidence is preferably selected at around the tenth point, that is around center of PSD 1.

If the fourth constant current source 24 does not exist (hence Ic=O, as is obvious from formulas (33) and (34), $T_2(Do)=T_2'(Do)=0$ under the same condition as the aforementioned) the light incident position x of reflected beam spot S is positioned farther than ($\frac{1}{2}-1/N$)l on the PSD 1 surface. The measuring operation cannot be conducted for the object. In practice, considering the above-mentioned fact, the current Ic is selected to avoid this problem.

Figure 8A:
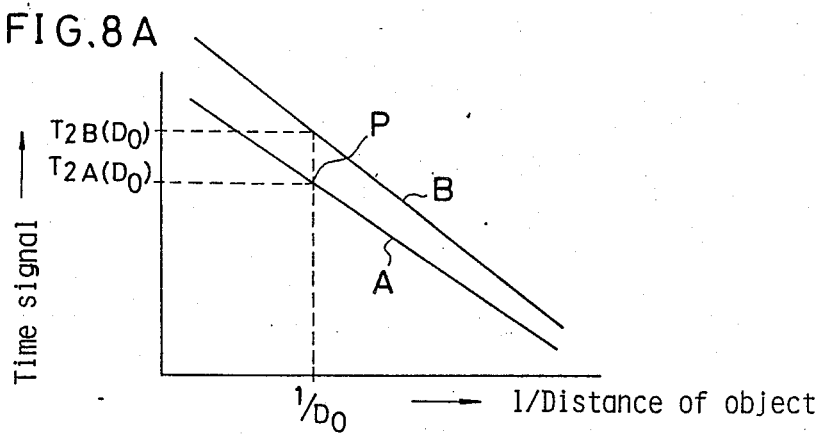
FIG. 8A, FIG. 8B and FIG. 8C are characteristic graphs similar to FIG. 4 for explanation of adjusting operation of PSD shown in the embodiment of FIG. 6.
Figure 8B:
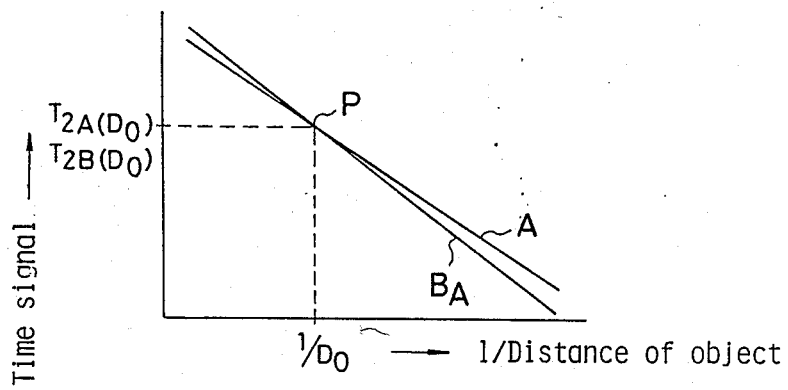
Figure 8C:
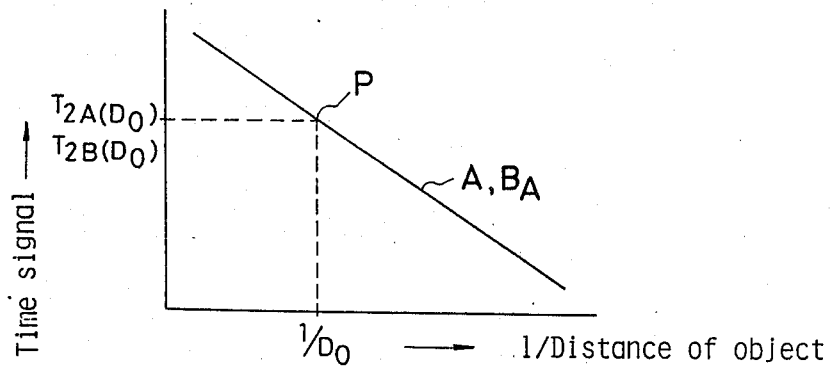

Referring to FIG. 8A, 8B and 8C, correcting operation for the slippage of setting position of PSD 1 embodying in FIG. 6 that shows the above-mentioned relationship of each current.

Corresponding parts and components to the embodiment of FIG. 5A and FIG. 8A are shown by the same marks, and the description thereon made in the embodiment of FIG. 5A similarly apply. The characteristic curve B is the characteristic of the PSD 1 that is mounted in the apparatus.

In the embodiment in FIG. 6, like the afore-mentioned embodiment, set the ratio of the constant current Io and Is to the fixed ratio, the center of rotation for adjusting the slope of the characteristic curve can be fixed at point P in curve A, wherein the time signal is $T_2A$ (Do) corresponding to the distance Do as previously described.

The way of setting the center of rotation may be brought by making agreement between the time signal $T_2B(Do)$ as given to distance Do of an object in characteristic curve B and the time signal $T_2A(Do)$ at the point P in previously described. More concretely, the characteristic curve B can be made to move in parallel toward curve A by changing the constant current Ic which is output by the fourth constant current source 24.

In FIG. 8B, the relationship between the characteristic curve $B_A$ (which is indicated after parallel movement) and desired characteristic curve A is indicated. In the following, the rotation of the characteristic curve $B_A$ around the center of the above-mentioned point P is described.

The rotation can be made by changing the constant current Is from the first constant current source 12. The center point of rotation is not moved, and the ratio of the constant current Is and the constant current Io to is kept fixed. The characteristic curves A and $B_A$ coincide as shown in FIG. 8C, correcting operation is completed. In the embodiment in FIG. 6, the shift of setting position of PSD 1 can be corrected by a single adjustment of the constant current Ic and Is. This correcting operation is simpler than in the embodiment of FIG. 2.

Two of the embodiments of the present invention have been disclosed. By considering the feature of the present invention that the electrical center of PSD 1 can be moved electrically by shifting the position of PSD 1 from the optical axis, the surface of PSD 1 can be more fully utilized.

The center of the PSD 1 is positioned on purpose at a position shifted to the side of anode $A_1$ from the optical axis, on which side the near distance signal flows. When correction of the above shift is effected by adjusting the constant current Is and Io, the effective length of the light receiving surface of PSD 1 can be used over the range of $\frac{1}{2}$ of its surface length, whereas hitherto only the range of within $\frac{1}{4}$ of the length has been utilizable.

In other words, the light receiving range of beam spot S is extended. As a result, reflected beam spot from closer objects can be received by the PSD and it can measure the distance of the closer objects.

Figure 9:
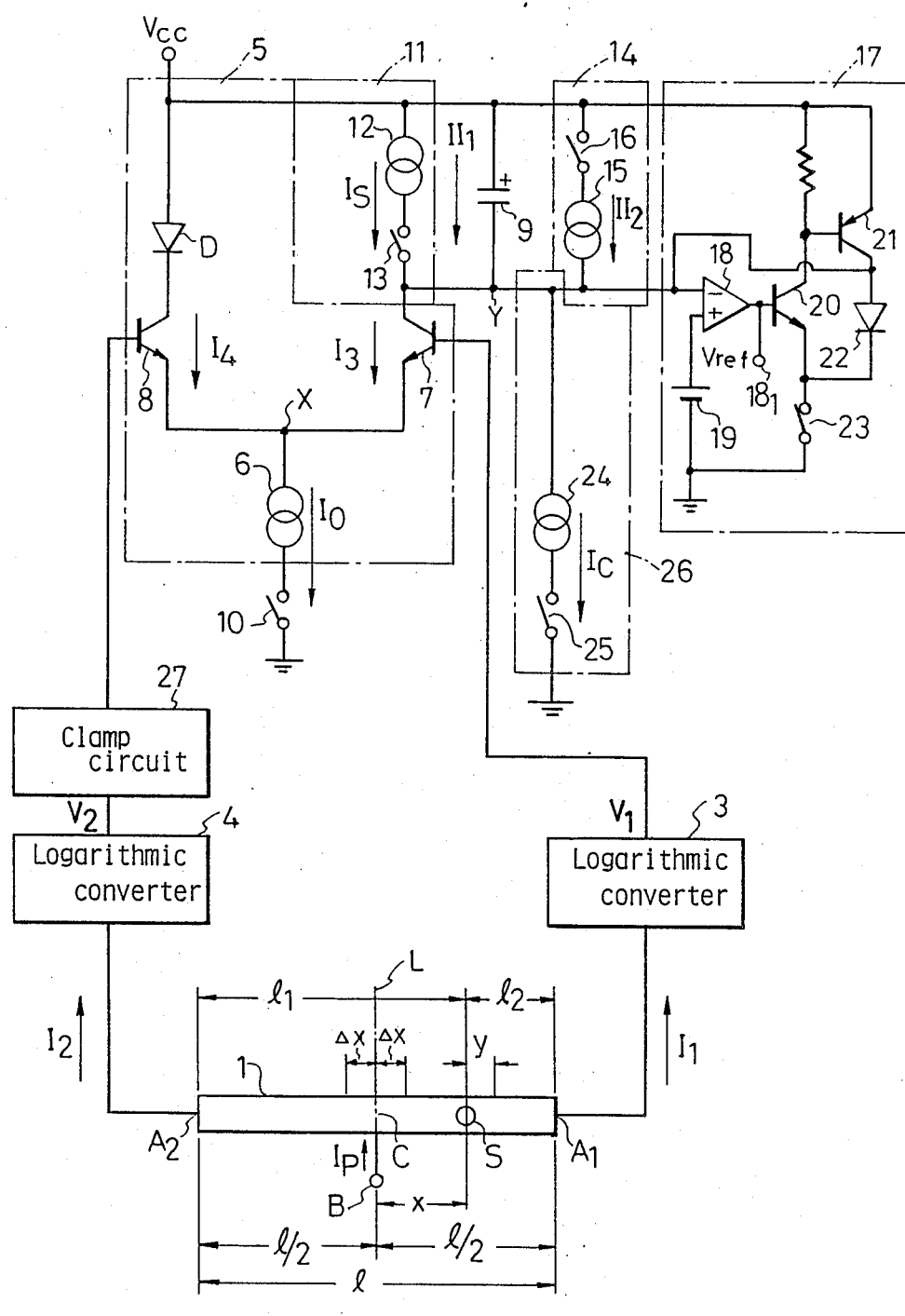
FIG. 9 is a connection diagram showing still another embodiment of the distance detecting apparatus embodying the present invention.

As illustrated in FIG. 9, by providing a clamp circuit 27 for processing long distance signals from objects, the apparatus becomes resistant to noise and can operate more reliably during the measuring operation.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A distance detecting apparatus comprising:
   a light receiving sensor for outputting a first photo-current and a second photo-current corresponding to an incident position of light reflected from an object onto the light receiving sensor;

photo-current conversion means including an integrating capacitor, for converting said first and second photo-currents into a time-based signal by charging or discharging said integrating capacitor utilizing a first control-current and a second control-current corresponding to a level of said first and second photo-currents, respectively;

current control means connected in parallel with the integrating capacitor for controlling charging or discharging of said integrating capacitor without changing a ratio of the amplitude of the first control-current over the amplitude of the second control-current; and coomparison means for comparing said time-based signal to a reference voltage and outputting comparison data indicative of said comparison.

2. The distance detecting apparatus of claim 1 wherein said current control means is for controlling the rate at which the integrating capacitor charges and discharges.

3. The distance detecting apparatus of claim 2 wherein said current control means further includes a charge-current control circuit, connected in parallel with the integrating capacitor means, for selectively outputting a first constant current for charging the integrating capacitor means, and a discharge-current control circuit, connected in parallel with the integrating capacitor means, for selectively outputting a second constant current for discharging the integrating capacitor means.

4. The distance detecting apparatus of claim 3 wherein said charge-current control means further comprises a first constant current source, and a switch connected in series with the first current source for selectively applying the first constant current source.

5. The distance detecting apparatus of claim 4 wherein said first constant current source is variable, thereby allowing adjustment of the rate at which the integrating capacitor charges.

6. The distance detecting apparatus of claim 3 wherein said discharge-current control means further comprises a second constant current source, and a switch connected in series with the second current source for selectively applying the first constant current source.

7. The distance detecting apparatus of claim 6 wherein said second constant current source is variable, thereby allowing adjustment of the rate at which the integrating capacitor discharges.

8. A distance detecting apparatus comprising:

a light receiving sensor which outputs a first photo-current and a second photo-current corresponding to an incident position of light reflected from an object onto the light receiving sensor;

logarithmic conversion means for forming a first logarithmic output voltage and a second logarithmic output voltage corresponding to said first photo-current and said second photo-current, respectively;

current coupling means for coupling a first output current which corresponds to the first logarithmic voltage, and a second output current which corresponds to the second logarithmic voltage, into a third constant current;

integrating capacitor means for charging and discharging at a predetermined rate and for a time which corresponds to said first or second output current;

current control means, connected in parallel with the integrating capacitor means, for controlling the rate at which the integrating capacitor charges and discharges; and comparison means for sensing when the integrating capacitor has discharged to a voltage level which is equal to a reference voltage level.

9. The distance detecting apparatus of claim 8 wherein said current control means further includes a charge-current control circuit, connected in parallel with the integrating capacitor means, for selectively outputting a first constant current for charging the integrating capacitor means for charging, and a discharge-current control circuit, connected in parallel with the integrating capacitor means, for selectively outputting a second constant current for discharging the integrating capacitor means.

10. The distance detecting apparatus of claim 9 wherein said charge-current control means further comprises a first constant current source, and a switch connected in series with the first current source for selectively applying the first current source.

11. The distance detecting apparatus of claim 10 wherein said first constant current source is variable, thereby allowing adjustment of the rate at which the integrating capacitor charges.

12. The distance apparatus of claim 9 wherein said discharge-current control means further comprises a second constant current source, and a switch connected in series with the second current source for selectively applying the first current source.

13. The distance detecting apparatus of claim 12 wherein said second constant current source is variable thereby allowing adjustment of the rate at which the integrating capacitor discharges.

14. The distance detecting apparatus of claim 8 wherein said current coupling means further includes a third constant current source, and a switch connected in series between the third constant current source and ground for selectively applying the first current source.

15. The distance detecting apparatus of claim 14 wherein said current coupling means further includes a first transistor having a base connected to the first logarithmic converter, and a second transistor having a base connected to the second logarithmic converter, said first and second transistors having emitters connected to the third constant current source such that when said third current source is selectively applied the sum of the amount of current flowing through the first and second transistors equals the amount of current supplied by the third constant current source, and the current flowing through the first and second transistors corresponds to the respective first and second logarithmic voltages, respectively.

16. The distance detecting apparatus of claim 15 wherein said third constant current source is variable, thereby allowing adjustment of the amount of current flowing through the first and second transistors.

17. A distance detecting apparatus comprising:

a light receiving sensor which outputs a first photo-current and a second photo-current corresponding to an incident position of light reflected from an object onto the light receiving sensor;

logarithmic conversion means for forming a first logarithmic output voltage and a second logarithmic output voltage corresponding to said first photo-current and said second photo-current, respectively;

current coupling means for coupling a first output current which corresponds to the first logarithmic voltage, and a second output current which corresponds to the second logarithmic voltage, into a third constant current;

integrating capacitor means for charging and discharging at a predetermined rate and for a time which corresponds to said first or second output current charge-current control means, connected in parallel with the integrating capacitor means, for selectively outputting a first constant current for charging the integrating capacitor means;

discharge-current control means, connected in parallel with the integrating capacitor means, for selectively outputting a second constant current for discharging the integrating capacitor means;

comparison means for sensing when the integrating capacitor has discharged to a voltage level which is equal to a reference voltage level; and.

control circuit means, connected in series between the integrating capacitor and ground, for adjusting the rate at which the integrating capacitor charges and discharges.

18. The distance detecting apparatus of claim 17 wherein said control circuit further comprises a fourth constant current source, and a switch connected in series with the fourth constant current source for selectively applying the first current source.

19. The distance detecting apparatus of claim 18 wherein said fourth constant current source is variable, thereby allowing adjustment of the amount of current flowing from the integrating capacitor to ground.

20. The distance detecting apparatus of claim 18 further including a clamp circuit, connected in series with one of said logarithmic converters, to improve noise immunity.

* * * * *